United States Patent
Sakamoto

(10) Patent No.: US 9,954,615 B2
(45) Date of Patent: Apr. 24, 2018

(54) OPTICAL UP/DOWN CONVERSION-TYPE OPTICAL PHASE CONJUGATE PAIR SIGNAL TRANSMISSION/RECEPTION CIRCUIT

(71) Applicant: NATIONAL INSTITUTE OF INFORMATION AND COMMUNICATIONS TECHNOLOGY, Nukui-Kitamachi, Koganei-shi, Tokyo (JP)

(72) Inventor: Takahide Sakamoto, Koganei (JP)

(73) Assignee: National Institute of Information and Communications Technology, Tokyo (JP)

(*) Notice: Subject to any disclaimer, the term of this patent is extended or adjusted under 35 U.S.C. 154(b) by 0 days.

(21) Appl. No.: 15/514,529

(22) PCT Filed: Sep. 2, 2015

(86) PCT No.: PCT/JP2015/074940
§ 371 (c)(1),
(2) Date: Mar. 26, 2017

(87) PCT Pub. No.: WO2016/063635
PCT Pub. Date: Apr. 28, 2016

(65) Prior Publication Data
US 2017/0264366 A1 Sep. 14, 2017

(30) Foreign Application Priority Data
Oct. 19, 2014 (JP) ................................ 2014-213264

(51) Int. Cl.
*H04B 10/2507* (2013.01)
*G02F 1/225* (2006.01)
(Continued)

(52) U.S. Cl.
CPC ....... *H04B 10/2507* (2013.01); *G02F 1/2255* (2013.01); *H04B 10/516* (2013.01); *H04B 10/58* (2013.01); *G02F 2001/212* (2013.01)

(58) Field of Classification Search
CPC ............................ H04B 10/2507; H04B 10/58
See application file for complete search history.

(56) References Cited

U.S. PATENT DOCUMENTS

| | | | | |
|---|---|---|---|---|
| 4,965,603 A | * | 10/1990 | Hong | H01Q 3/2676 342/372 |
| 5,101,450 A | * | 3/1992 | Olshansky | H04J 14/0298 385/14 |

(Continued)

FOREIGN PATENT DOCUMENTS

| | | |
|---|---|---|
| JP | 2006-333347 A | 12/2006 |
| JP | 2010028470 A | 2/2010 |

OTHER PUBLICATIONS

International Search Report of International Application No. PCT/JP2015/074940 completed Oct. 5, 2015 and dated Oct. 13, 2015 (4 pages).

(Continued)

*Primary Examiner* — Danny Leung
(74) *Attorney, Agent, or Firm* — Pyprus Pte Ltd

(57) ABSTRACT

To provide a method capable of easily compensating waveform distortion due to a non-linear effect caused by a complicated electric circuit, and a device for implementing the method. Provided are a method capable of effectively compensating signal degradation such as waveform distortion due to a nonlinear effect caused by an optical fiber that is an optical transfer path using an optical phase conjugate signal pair at the time of optical up-conversion or down-conversion, and a device capable of implementing the method. This emission device 25 includes an optical modulator 11, a signal source 13, an optical fiber 15, a multiplex- (Continued)

ing unit 17, a multiplexing local signal source 19, an optical detector 12, and a transmission antenna 23.

4 Claims, 20 Drawing Sheets

(51) Int. Cl.
*H04B 10/516* (2013.01)
*H04B 10/58* (2013.01)
*G02F 1/21* (2006.01)

(56) References Cited

U.S. PATENT DOCUMENTS

| | | | | |
|---|---|---|---|---|
| 5,239,401 A * | 8/1993 | Olshansky | ............ | G02F 1/0327 385/3 |
| 5,301,058 A * | 4/1994 | Olshansky | ............ | G02F 1/0327 359/246 |
| 5,386,314 A * | 1/1995 | Jopson | ............ | G02F 1/3536 359/326 |
| 6,020,990 A * | 2/2000 | Brock | ............ | H04B 10/2563 342/368 |
| 6,879,433 B1 * | 4/2005 | Yamashita | ............ | G02F 1/3536 359/326 |
| 7,149,434 B2 * | 12/2006 | Butman | ............ | H04B 10/2507 398/185 |
| 7,773,883 B1 * | 8/2010 | Weng | ............ | H04J 14/0208 398/3 |
| 7,982,683 B2 * | 7/2011 | Peyla | ............ | H01Q 1/273 343/853 |
| 9,258,061 B2 * | 2/2016 | Olsson | ............ | H04B 10/5053 |
| 9,621,270 B2 * | 4/2017 | Yu | ............ | H04L 5/04 |
| 2002/0196507 A1 * | 12/2002 | Stuart | ............ | H04B 10/2513 398/178 |
| 2014/0099127 A1 * | 4/2014 | Tian | ............ | H04B 10/2543 398/152 |
| 2017/0264366 A1 * | 9/2017 | Sakamoto | ............ | H04B 10/2507 |

OTHER PUBLICATIONS

Sakamoto, Takahide et al., Phase-Conjugated Twin Signals Generation with Oppositely-Biased Paired IQ Modulators, 2014, IEEE Photonics Conference, Oct. 12, 2014, pp. 300-301.

Sakamoto, Takahide et al., Conjugated-Paired Radio-on-Fiber Transmission Scheme Highly Tolerant against Optical Fiber Nonlinearity, MWP/APMP 2014, Oct. 20, 2014, pp. 399-402.

* cited by examiner

OPTICAL UP/DOWN CONVERSION-TYPE OPTICAL PHASE CONJUGATE PAIR SIGNAL TRANSMISSION/RECEPTION CIRCUIT

TECHNICAL FIELD

The present invention relates to a method and a device that can compensate a non-linear effect that is caused when an optical signal and the optical fiber radio signal are transmitted through an optical fiber.

BACKGROUND ART

In an optical fiber radio system, enhancement of input intensity to an optical fiber leads to an increase of an RF link gain, extension of a transmission distance, and the like, and therefore is an important issue. However, when the light intensity input to the optical fiber is strengthened, it becomes impossible to perform linear transmission of the signal because it is affected by the non-linear effect caused in the optical fiber. Thus, the light intensity of optical input is limited to several mW in the current optical fiber radio systems.

Meanwhile, complicated optical multiplexing systems such as a coherent optical transmission system of optical phase shift keying (optical PSK), optical quadrature amplitude modulation (optical QAM), and the like, and optical orthogonal frequency division multiplexing (optical OFDM) have also attracted attention in optical fiber transmission, optical fiber radio transmission and the like. In the case of transmitting these optical signals, influence of an optical non-linear effect in a transmission path cannot be ignored, and there is a strong demand for a compensation method thereof.

JP 2010-28470 A discloses an optical signal receptor which includes an electric operating circuit for compensation of a non-linear waveform distortion and the compensation of the non-linear distortion using an optical phase conjugate pair signal. However, when the waveform distortion caused by the non-linear effect in an optical transmission path is compensated using the electric circuit, there is a problem that the device becomes complicated, a problem that providings of a plurality of optical modulators using a pre-processed electric signal obtained by digital signal processing or the like for the generation of the optical phase conjugate pair signal becomes necessary on the transmitter side, and a problem that performance of electrical signal processing using digital signal processing or the like becomes necessary on the receiver side.

CITATION LIST

Patent Literature

Patent Literature 1: JP 2010-28470 A

SUMMARY OF INVENTION

Technical Problem

The present invention aims to provide a method of simply compensating a distortion of a waveform due to a non-linear effect caused by a complicated electric circuit and a device for implementation of the method.

More specifically, the present invention aims to provide a method capable of effectively compensating deterioration of a signal, such as a distortion of a waveform caused due to a non-linear effect of an optical fiber serving as an optical transport path, by using an optical phase conjugate signal pair at the time of optical up conversion or down conversion, and a device capable of implementing the method.

Solution to Problem

The present invention is basically configured to offset the non-linear effect by generating double sidebands during optical modulation and effectively interfering the sidebands or components derived from the sidebands using the sidebands as the optical phase conjugate signal pair. Accordingly, the present invention can easily compensate the non-linear effect caused by the optical fiber without using a complicated electric circuit.

A first aspect of the present invention relates to a homodyne phase conjugate radio wireless (C-RoF) system to be described later, and a method of compensating a non-linear optical effect, caused when an optical signal propagates through an optical fiber by means of the system.

In this method, an upper sideband and a lower sideband are simply generated using intensity modulation, amplitude modulation, phase modulation, and the like of light performed by direct modulation or external modulation of a semiconductor laser and the like, this pair of signals has a phase conjugate relationship, and these upper sideband and lower sideband are used as the phase conjugate signal pair. The upper sideband and the lower sideband are simultaneously input to the optical fiber. In an optical receiver or a remote station, continuous light having the same frequency as an optical carrier wave is multiplexed as a carrier signal. At this time, the signal is multiplexed with the upper sideband and the lower sideband in a state where there is no phase difference between the upper sideband and the lower sideband. The multiplexed optical signal is detected by a photodetector. An electric signal based on the optical signal detected by the photodetector is transmitted to a transmitting antenna. The transmitting antenna emits a radio signal based on the electric signal. Further, the radio signal is received on the receiver side. Incidentally, when the continuous light having the same frequency as the optical carrier wave is multiplexed as the carrier signal in the optical receiver, an optical signal in the state of being multiplexed is propagated through the optical fiber.

The homodyne C-RoF system includes an emission device 25 of a radio signal obtained by compensating the non-linear optical effect caused when the optical signal is propagated through the optical fiber. Incidentally, this system functions as an optical signal output system of using the phase conjugate signal pair that is capable of effectively compensating the non-linear effect caused by the optical fiber caused in a part prior to the photodetector. The emission device 25 includes an optical modulator 11, a signal source 13, an optical fiber 15, a multiplexing unit 17, a multiplexing local signal source 19, a photodetector 21, and a transmitting antenna 23.

The optical modulator 11 is an element to which the carrier wave is input. Further, the optical modulator 11 outputs the phase conjugate signal pair including the upper sideband and the lower sideband. The signal source 13 is an element which outputs a modulation signal and a bias signal that are applied to the optical modulator 11. The optical fiber 15 is an element to which the phase conjugate signal pair including the upper sideband and the lower sideband, as the optical signal output from the optical modulator 11, is simultaneously input, and which is configured to propagate the optical signal. The multiplexing unit 17 is an element which is connected to the optical fiber 15 and configured to multiplex the optical signal including the phase conjugate signal pair and an optical signal (local continuous light and local light to be described below) from the outside. The multiplexing unit 17 may be provided in an arbitrary location in an optical transmitter, the optical receiver or the optical fiber transmission path, and the local light may be multiplexed with the optical signal including the phase conjugate signal pair at this arbitrary location. The multiplexing local signal source 19 is an element configured to multiplex the optical signal having the same frequency as the optical carrier wave with the upper sideband and the lower sideband in a state where there is no phase difference between the upper sideband and the lower sideband using the multiplexing unit 17. The photodetector is an element configured to detect the multiplexed optical signal. The transmitting antenna 23 is an element that receives the electric signal based on the optical signal detected by the photodetector. The transmitting antenna 23 emits the radio signal based on the electric signal, and transmits the radio signal to the receiver side.

A second aspect of the present invention relates to a heterodyne C-RoF system to be described later, and a method of compensating a non-linear optical effect, caused when an optical signal is propagated through an optical fiber, using the system.

In this method, a phase conjugate signal pair including an upper sideband and a lower sideband is obtained using intensity modulation, amplitude modulation, phase modulation, and the like of light performed by direct modulation or external modulation of a semiconductor laser and the like. Next, the upper sideband and the lower sideband are simultaneously input to an optical fiber. The optical signal is multiplexed with the upper sideband and the lower sideband. The multiplexed optical signal is detected by a photodetector. An electric signal based on the optical signal detected by the photodetector is transmitted to a transmitting antenna. The transmitting antenna emits a radio signal based on the electric signal. The radio signal emitted from the transmitting antenna is received by the receiving antenna. An electric signal based on the radio signal received by the receiving antenna is received, and a signal derived from the upper sideband and a signal derived from the lower sideband are adjusted such that there is no phase difference therebetween, and then, multiplexed.

The heterodyne C-RoF system includes a transmission device and a reception device. A radio signal transmission device 45 includes an optical modulator 31, a signal source 33, an optical fiber 35, a multiplexing unit 37 connected to the optical fiber 35, a multiplexing local signal source 39, a photodetector 41, and a transmitting antenna 43. A radio signal reception device 55 includes a receiving antenna 51 and a signal processing device 53.

The optical modulator 31 is an element to which a carrier wave is input. The signal source 33 is an element which outputs a modulation signal and a bias signal that are applied to the optical modulator 31. The optical fiber 35 is an element to which the phase conjugate signal pair including the upper sideband and the lower sideband, as the optical signal output from the optical modulator 31, is simultaneously input. The multiplexing unit 37 is an element which is connected to the optical fiber 35 and configured to multiplex light. It is possible to multiplex the optical signal (local light) with the upper sideband and the lower sideband using the multiplexing local signal source 39 and the multiplexing unit 37. The photodetector 41 is an element configured to detect the multiplexed optical signal. The transmitting antenna 43 is an element configured to receive the electric signal based on the optical signal detected by the photodetector and to emit the received electric signal as the radio signal.

The receiving antenna 51 is an element configured to receive the radio signal emitted from the transmitting antenna 43. The signal processing device 53 is an element configured to receive the electric signal based on the radio signal received by the receiving antenna, and to adjust a signal derived from the upper sideband and a signal derived from the lower sideband such that there is no phase difference therebetween, and then, multiplex the signals. In the heterodyne C-ROF system, a wavelength or a frequency, which is different from that of the optical carrier wave, is applied as a wavelength of a frequency of the local light to be multiplexed by the multiplexing unit 37.

Advantageous Effects of Invention

According to the present invention, it is possible to provide the method and the system capable of easily compensating the non-linear effect caused by the optical fiber.

DESCRIPTION OF EMBODIMENTS

Compensation Principle of Non-Linear Effect Using Optical Phase Conjugate Signal Pair An example of a compensation principle of a non-linear effect using an optical phase conjugate signal pair is given as follows.

A pair of an original transmission signal and a signal that has been phase-conjugated is transmitted through an optical fiber. Then, both original signal light and phase conjugate light experience the same non-linear phase shift in the optical fiber. However, a phase shift with a reverse sign is caused in the phase conjugate signal with reference to the original signal. It is possible to offset the non-linear effect such as a non-linear distortion by performing the offset using the fact that the original signal light and the phase conjugate light receive the same non-linear effect in reverse signs.

In an example of the present invention, the optical phase conjugate signal pair is generated at the time of performing optical modulation in an optical modulator. This system is called an electro-optical effect phase conjugate signal pair generator. When the electro-optical effect phase conjugate signal pair generator is used, it is possible to generate the phase conjugate signal pair only by using an original data set without converting an electric signal for phase conjugation, and it is possible to make a configuration of a transmitter side simpler.

A first aspect of the present invention relates to a homodyne phase conjugate radio wireless (C-RoF) system to be described later, and a method of compensating a non-linear optical effect, caused when an optical signal is propagated through an optical fiber, using the system.

Figure 1:
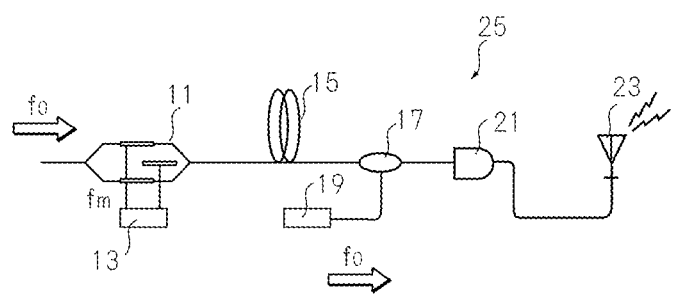
FIG. 1 is a block diagram illustrating a configuration example of a homodyne C-RoF system.

FIG. 1 is a block diagram illustrating a configuration example of the homodyne C-RoF system. The homodyne C-RoF system includes a radio signal emission device obtained by compensating the non-linear optical effect caused when the optical signal propagates through the optical fiber. Incidentally, this system functions as an optical signal output system of using the phase conjugate signal pair in which the non-linear effect caused by the optical fiber is effectively compensated in a part prior to a photodetector. As illustrated in FIG. 1, a emission device 25 includes an optical modulator 11, a signal source 13, an optical fiber 15, a multiplexing unit 17 connected to the optical fiber 15, a multiplexing local signal source 19, a photodetector 21, and a transmitting antenna 23.

The optical modulator 11 is an element to which the carrier wave is input. Further, the optical modulator 11 outputs the phase conjugate signal pair including the upper sideband and the lower sideband. The optical modulator 11 can suitably use a known modulator such as an intensity modulator, a phase modulator, a frequency modulator, an SSB modulator, an FSK modulator, a QPSK modulator, and an ASK modulator. Among these, it is possible to preferably use a modulator including a Mach-Zehnder interferometer.

For example, Japanese Patent No. 5263205 describes an optical modulator including a Mach-Zehnder interferometer in which phase conjugate light as well as modulation signal can be output, and a higher-side frequency component and a lower-side frequency component are acquired from the phase conjugate light (although this literature is a literature that discloses a technique of controlling a delay difference). Similarly to this literature, a higher-side frequency component and a lower-side frequency component may be acquired from the phase conjugate light included in the optical modulator and set as the phase conjugate signal pair.

A frequency of an optical carrier wave is set as $f_0$ [Hz], and a frequency of a modulation signal is set as $f_m$ [Hz]. Then, not only the carrier wave ($f_0$) but also a plurality of components whose frequencies are represented by $f_0 \pm nf_m$ [Hz] (n is an integer) are present in optical output. These are present on a side face of the carrier wave $f_0$, and thus, called sidebands. Among them, a component present at $f_0+f_m$ [Hz] is called a first-order sideband or an upper sideband (USB) as a frequency thereof is present at a higher position than that of the carrier wave ($f_0$). Among them, a component present at $f_0-f_m$ [Hz] is called a negative first-order sideband or a lower sideband (LSB) as a frequency thereof is present at a lower position than that of the carrier wave ($f_0$). Incidentally, the first-order sideband and the negative first-order sideband are simply expressed together as the first-order sideband in some cases, and the component of $f_0+f_m$ [Hz] and the component of $f_0-f_m$ [Hz] are collectively called the first-order sideband in the present specification. However, a pair of a component present at $f_0+nf_m$[Hz] (n is an integer of one or more) and a component present at $f_0-nf_m$ [Hz] may be called the phase conjugate signal pair.

The signal source 13 is an element which outputs a modulation signal and a bias signal that are applied to the optical modulator 11. The optical modulator 11 is driven using an electric signal (voltage) such as the modulation signal and the bias signal. The signal source 13 is a device configured to obtain this electric signal and control the optical modulator. The output from the optical modulator is deployed using Bessel function. That is, it is generally possible to change a condition with which an odd-order component (the first-order sideband, a third-order sideband, a fifth-order sideband and so on) is strengthened, and a condition with which the carrier wave and an even-order component (a second-order sideband, a fourth-order sideband, a sixth-order sideband and so on) is strengthened by adjusting the bias voltage to be applied to the optical modulator. That is, virtually, when only the bias signal is applied without applying the modulation signal to the optical modulator, it is possible to adjust the even or odd order of the optical signal to be output by controlling a state where light intensity becomes strong or a state were light intensity becomes weak. In addition, it is possible to adjust the intensity of components of each order by adjusting the intensity of the modulation signal. Meanwhile, when there is unnecessary light, an unnecessary component may be removed using a known filter.

The optical fiber 15 is an element to which the phase conjugate signal pair including the upper sideband and the lower sideband, as the optical signal output from the optical modulator 11, is simultaneously input, and which is configured to propagate the optical signal. An example of the optical fiber is a single-mode fiber, but a multi-mode fiber may be used.

The multiplexing unit 17 is an element which is connected to the optical fiber 15 and configured to multiplex the phase conjugate signal pair and the optical signal (hereinafter, referred to as continuous light and "local light") from the outside. The multiplexing unit 17 may be provided in an arbitrary location in the optical transmitter, the optical receiver, or the optical fiber transmission path. An example of the multiplexing unit is a photocoupler, and the multiplexing unit may be constructed using a light guide.

The multiplexing local signal source 19 is an element configured to multiplex the optical signal having the same frequency as the optical carrier wave with the upper sideband and the lower sideband in a state where there is no phase difference between the upper sideband and the lower sideband using the multiplexing unit 17. It is preferable to multiplex the phase conjugate signal pair and the local light in a state where a phase difference between the upper sideband and the local light and a phase difference between the lower sideband and the local light are the same. In addition, the multiplexing may be performed in a state where there is no phase difference between the upper sideband and the lower sideband, and there is no phase difference between each sideband and the optical signal. The multiplexing local signal source 19 preferably obtains the optical signal (local light) which is synchronized with the optical carrier wave and has the same frequency as the optical carrier wave. Further, the multiplexing local signal source 19 guides the local light to the multiplexing unit in a state where a frequency f, a phase φ, and a phase angle θ of the local light have been suitably adjusted. The phase angle θ may be adjusted using a phase shifter or the like which is an element of the multiplexing local signal source 19. The multiplexing unit may be already present on the transmitter side (prior to the optical fiber), in the middle of the optical fiber (for example, a relay point), or on the receiver side (subsequent to the optical fiber). The multiplexing local signal source 19 obtains the optical signal (local light) having the same frequency as the optical carrier wave. This optical signal may be a signal obtained by demultiplexing the previous carrier wave or an optical signal that has been prepared separately from the carrier wave. Further, for example, the multiplexing local signal source 19 performs control in such a manner that a clock signal is received from a light source which outputs the carrier wave, phases of the upper sideband and the lower sideband are analyzed using the clock signal, and then, the local light, the upper sideband, and the lower sideband are multiplexed by the multiplexing unit at a timing at which there is no phase difference among the local light, the upper sideband, and the lower sideband. The phase angle θ of the local light may be adjusted to be an average between a phase angle of the upper sideband and a phase angle of the lower sideband in order to make the state where there is no phase difference among the local light, the upper sideband, and the lower sideband. When there is a detection unit that detects the upper sideband and the lower sideband at any space, the multiplexing local signal source 19 may perform control such that the local light, the upper sideband, and the lower sideband are multiplexed by the multiplexing unit at the timing at which there is no phase difference among the local light, the upper sideband, and the lower sideband by obtaining information from the detection unit.

The photodetector is an element configured to detect the multiplexed optical signal. The photodetector has been known, and can suitably use a photodiode and the like.

The transmitting antenna 23 is an element that receives the electric signal based on the optical signal detected by the photodetector. The transmitting antenna 23 emits the radio signal based on the electric signal, and transmits the radio signal to the receiver side.

The method of compensating the non-linear optical effect caused when the optical signal is propagated through the optical fiber by using the homodyne C-RoF system includes the following steps.

The optical carrier wave is input to the optical modulator. Further, the signal source 13 outputs the modulation signal and the bias signal that are applied to the optical modulator 11. The optical modulator is driven by the modulation signal and the bias signal and outputs the phase conjugate signal pair including the upper sideband and the lower sideband. This optical signal may include the carrier wave in addition to the phase conjugate signal pair. In addition, when there is an unnecessary optical component, the component may be suitably removed by an optical filter. A method of obtaining the phase conjugate signal pair including the upper sideband and the lower sideband has been known as disclosed in for example, Japanese Patent No. 5263205.

Next, the phase conjugate signal pair including the upper sideband and the lower sideband is simultaneously input to the optical fiber. Thereafter, these optical signals are propagated through the optical fiber. The local light as the optical signal having the same frequency as the optical carrier wave is generated. Further, the local light is multiplexed with the upper sideband and the lower sideband in a state where there is no phase difference between the upper sideband and the lower sideband, by using the multiplexing unit. Then, the distortion of the non-linearity of the optical fiber is offset. Then, the photodetector detects the multiplexed optical signal.

Incidentally, the local light and the phase conjugate signal pair may be input to the optical fiber after being multiplexed by the multiplexing unit. In addition, the multiplexing unit may be provided in the middle of the optical fiber.

When optical signals having different frequencies are simultaneously input to the photodetector, an electric signal (difference frequency component) corresponding to a frequency difference between the optical signals is output (incidentally, a component (sum frequency component) corresponding to a sum of the frequencies is also output at this time). Thus, when the two sidebands ($f_0 \pm nf_m$) are superimposed on the optical carrier wave ($f_0$), and then, the resultant is input to the photodetector, an electric signal ($nf_m$), which corresponds to a frequency difference between the optical carrier wave ($f_0$) and the sideband, is generated from the light receiver (photodetector). If the optical carrier wave is suppressed at this time, an electric signal ($2nf_m$), which corresponds to a frequency difference between the two sidebands, is generated. If the intensity of the optical carrier wave input to the photodetector is stronger than the intensity of the sideband, the electric signal ($nf_m$), which corresponds to the frequency difference between the optical carrier wave ($f_0$) and the sideband is mainly output, and the electric signal ($2nf_m$), which corresponds to the frequency difference between the two sidebands, can be ignored. Meanwhile, if the electric signal ($2nf_m$), which corresponds to the frequency difference between the two sidebands, is unnecessary, this component may be electrically removed.

The electric signal based on the optical signal detected by the photodetector is transmitted to the transmitting antenna. The transmitting antenna emits the radio signal based on the electric signal. Further, the receiver side receives the radio signal.

A second aspect of the present invention relates to a heterodyne C-RoF system to be described later, and a method of compensating a non-linear optical effect, caused when an optical signal is propagated through an optical fiber, using the system.

Figure 2:
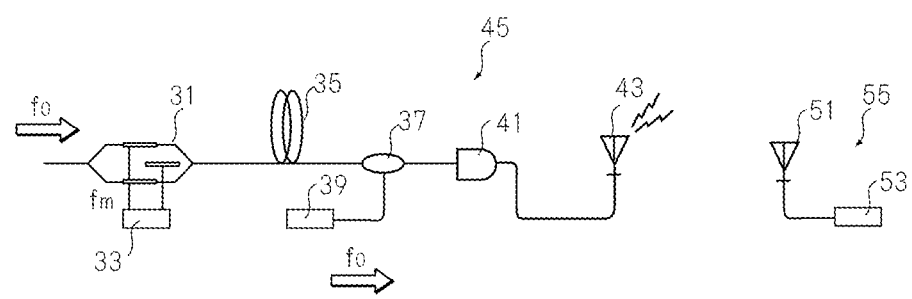
FIG. 2 is a block diagram illustrating a configuration example of a heterodyne C-RoF system.

FIG. 2 is a block diagram illustrating a configuration example of a heterodyne C-RoF system. As illustrated in FIG. 2, the heterodyne C-RoF system includes a transmission device and a reception device. A radio signal transmission device 45 includes an optical modulator 31, a signal source 33, an optical fiber 35, a multiplexing unit 37 connected to the optical fiber 35, a multiplexing local signal source 39, a photodetector 41, and a transmitting antenna 43. A radio signal reception device 55 includes a receiving antenna 51 and a signal processing device 53.

The optical modulator 31 is an element to which a carrier wave is input. The signal source 33 is an element which outputs a modulation signal and a bias signal that are applied to the optical modulator 31. The optical fiber 35 is an element to which the phase conjugate signal pair including the upper sideband and the lower sideband, as the optical signal output from the optical modulator 31, is simultaneously input. The multiplexing unit 37 is an element which is connected to the optical fiber 35 and configured to multiplex (or demultiplex) light. The multiplexing unit 37 is the element configured to multiplex the optical signal with the upper sideband and the lower sideband using the multiplexing local signal source 39 and the multiplexing unit 37. The photodetector 41 is an element configured to detect the multiplexed optical signal. The transmitting antenna 43 is an element configured to receive the electric signal based on the optical signal detected by the photodetector and to emit the received electric signal as the radio signal.

The receiving antenna 51 is an element configured to receive the radio signal emitted from the transmitting antenna 43. The signal processing device 53 is an element configured to receive the electric signal based on the radio signal received by the receiving antenna, and to adjust a signal derived from the upper sideband and the lower sideband, such that there is no phase difference therebetween, and then, multiplex the signals.

This method obtains the phase conjugate signal pair including the upper sideband and the lower sideband. Next, the upper sideband and the lower sideband are simultaneously input to an optical fiber. The optical signal (local light) is multiplexed with the phase conjugate signal pair including the upper sideband and the lower sideband. The multiplexed optical signal is detected by a photodetector. An electric signal based on the optical signal detected by the photodetector is transmitted to a transmitting antenna. The transmitting antenna emits a radio signal based on the electric signal. The radio signal emitted from the transmitting antenna is received by the receiving antenna. An electric signal based on the radio signal received by the receiving antenna is received, and a signal derived from the upper sideband and a signal derived from the lower sideband are adjusted such that there is no phase difference therebetween, and then, multiplexed.

Incidentally, the local light and the phase conjugate signal pair may be input to the optical fiber after being multiplexed by the multiplexing unit. In addition, the multiplexing unit may be provided in the middle of the optical fiber.

Figure 3:
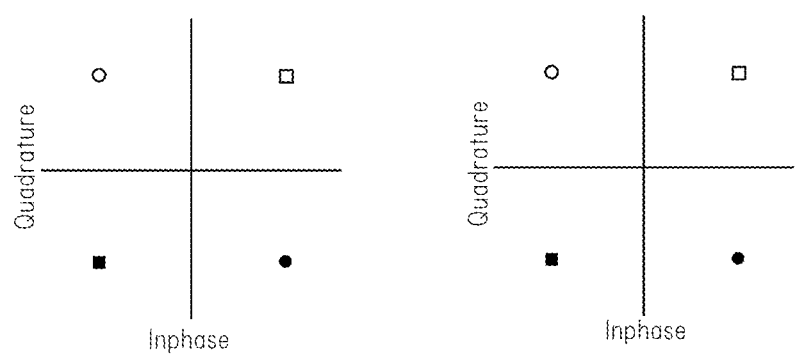
FIG. 3 illustrates an example (case of QPSK modulation) of a signal generated in a state where there is no phase difference in a phase conjugate signal pair.
Figure 4:
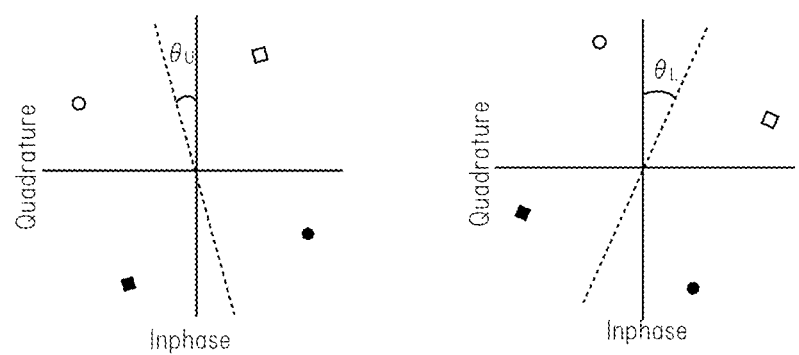
FIG. 4 illustrates an example (case of QPSK modulation) of a signal generated in a case where a phase difference between an upper sideband and a lower sideband is not optimized, that is, a case where the phase difference is not zero.

In order to implement the non-linear compensation according to the above-described method, it is preferable to add the upper sideband and the lower sideband forming the phase conjugate signal pair such that there is no phase difference therebetween. It is preferable to multiplex the phase conjugate signal pair and the local light in a state where a phase difference between the upper sideband and the local light and a phase difference between the lower sideband and the local light are the same. FIG. 3 illustrates an example (case of QPSK modulation) of a signal generated in a state where there is no phase difference in the phase conjugate signal pair. The left drawing illustrates a constellation map of the USB, and the right drawing illustrates a constellation map of the LSB. This condition is obtained by suitably controlling an optical phase of the local light to be multiplexed by the multiplexer 17 in the case of the homodyne C-RoF. FIG. 4 illustrates an example (case of QPSK modulation) of a signal generated in a case where the phase difference between the upper sideband and the lower sideband is not optimized, that is, a case where the phase difference is not zero. The left drawing illustrates a constellation map of the USB, and the right drawing illustrates a constellation map of the LSB. In this case, the non-linear distortion in the optical fiber is not completely offset, and a distortion component remains. In addition, a phase difference between signals of the upper sideband and the lower sideband differs depending on a modulation technique on an optical transmitter side. The phase difference is 90 degrees in the case of being generated by phase modulation, and zero in the case of being generated by amplitude modulation. In addition, when components of the upper sideband and the lower sideband are obtained by direct modulation and the like using a laser, the amplitude modulation and the phase modulation are mixedly present due to a chirp effect at the time of modulation, and the phase difference between signals of the upper sideband and the lower sideband becomes a value between 0 and 90 degrees. In addition, the upper sideband and the lower sideband are subjected to different phase shifts due to wavelength dispersion caused in the optical fiber.

In such a case, local light with an average value $\theta$, that is, $(\theta_Y+\theta_A)/2$ of the phase angles the upper sideband (whose phase angle is set to $\theta_Y$) and the lower sideband (whose phase angle is set to $\theta_A$) may be multiplexed in order to offset the non-linear effect. In this case, the difference between the phase angles of the local light and the upper sideband and the difference between the phase angles of the local light and the lower sideband become the same value. Under this condition, non-linear distortions received by the upper sideband and the lower sideband become distortions which have equal length in the reverse direction, and are offset when being added. In addition, this principle can be also applied to a method of using a bias shift of the optical modulator to be described later and the conventional method of generating a phase conjugate pair. In the conventional system, a value of an optical phase difference between a phase conjugate pair is arbitrary. In this case, non-linear distortion can be compensated by multiplexing local light with a phase angle $\theta$ and the phase conjugate pair. The local light having the above-described suitable phase angle can be generated using a method of using an independent light source or a method of reusing the optical carrier wave.

Figure 5:
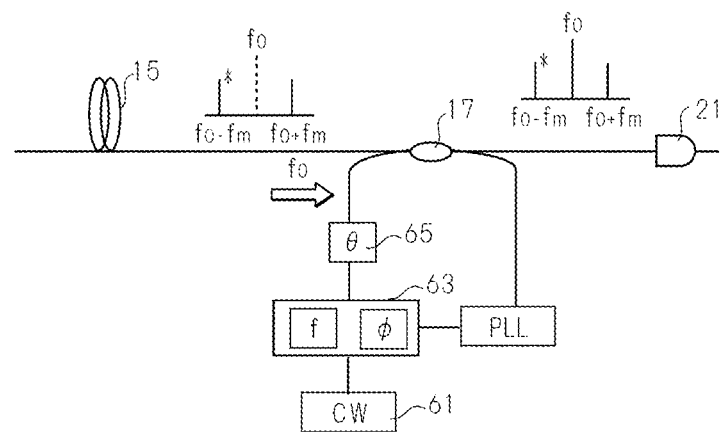
FIG. 5 is a block diagram illustrating a configuration example for generation of local light by using an independent light source.

FIG. 5 is a block diagram illustrating a configuration example for generation of the local light by using the independent light source. In the method of using the independent light source, for example, an optical phase-locked loop or the like is used, and the local light can be generated using a light source independent from a light source on the transmitter side as a local light source. The multiplexing local signal source 19 includes a light source 61 which generates light having the same frequency as the carrier wave, an adjustment unit 63 which adjusts a frequency, intensity, and a phase of light output from the light source, a phase adjustment unit 65, such as a phase shifter, which adjusts the phase of the light that has been adjusted by the adjustment unit 63, and a detection unit 57 which detects the phase of the light propagated through the multiplexing unit and obtains information to adjust a quantity of the phase or the like to be adjusted by the adjustment unit 53 and the phase adjustment unit 63. The local light is controlled using the optical phase-locked loop (optical PLL) so as to have the same optical frequency as an optical frequency f and an optical phase of the optical carrier wave transmitted from the optical transmitter side. The local light is caused to have the above-described optimal phase angle $\theta_{opt}$ using the optical phase shifter, with respect to the local light that has been subjected to these optical frequency synchronization and optical phase synchronization, thereby keeping a condition that enables the offset of the non-linear effect. This optical phase-locked loop may be present closer to the optical modulator side than the optical fiber, in the middle of the optical fiber, at a latter stage of the optical fiber, and at a part subsequent to the optical fiber.

Figure 6:
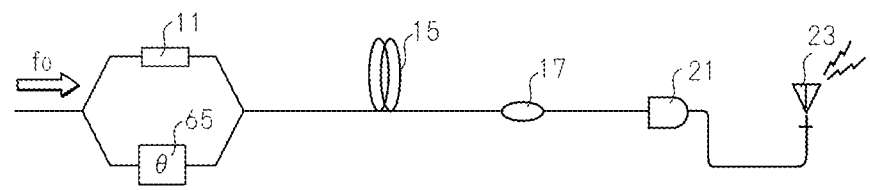
FIG. 6 is a block diagram illustrating a configuration example for generation of local light by reusing an optical carrier wave.

FIG. 6 is a block diagram illustrating a configuration example for generation of the local light by reusing the optical carrier wave. In this example, the optical carrier wave is branched. Further, one beam of branched light is applied to the optical modulator as the optical carrier wave. On the other hand, a remaining beam of branched light is input to the phase adjustment unit 55, such as the phase shifter, and the phase is adjusted such that the above-described state can be achieved in the multiplexing unit. In this case, both the phase conjugate signal pair and the local light may be propagated through the optical fiber, or the phase conjugate signal pair may be propagated through the optical fiber, and then, be multiplexed with the local light.

Figure 7:
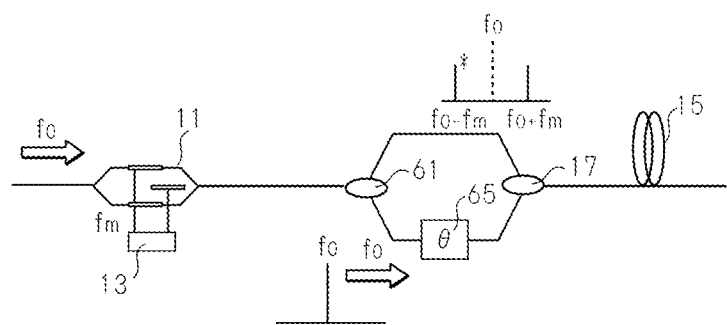
FIG. 7 is a block diagram illustrating a configuration example for generation of the local light by reusing the optical carrier wave.

FIG. 7 is a block diagram illustrating a configuration example for generation of the local light by reusing the optical carrier wave. In this example, a wavelength is separated by a wavelength separation device 61 after obtaining the phase conjugate signal pair using the optical modulator. Further, a component having a frequency corresponding to the optical carrier wave is input to the phase adjustment unit 55, such as the phase shifter, and the phase is adjusted such that the above-described situation can be achieved in the multiplexing unit.

In the method of reusing the optical carrier wave, the optical carrier wave on the optical transmitter side is reused as the local light. The optical carrier wave branched from the continuous light before being subject to the optical modulation may be separated. Alternatively, the optical carrier wave may be separated from modulation light after being subjected to the optical modulation for generation of the upper sideband and the lower sideband using the optical filter or the like.

The local light obtained in these methods is multiplexed with the phase conjugate signal pair by the multiplexer 17. A multiplexing location may be the optical transmitter side, the receiver side, or an arbitrary location in the middle of the optical fiber transmission path. An optical phase modulator, an optical SSB (single sideband) modulator, an optical fiber stretcher, and the like may be used as the optical phase shifter.

In the case of the heterodyne C-RoF system, it is preferable to apply the optical carrier wave with the optical frequency difference $\Delta f$ [Hz] on the optical transmitter side to local light $f_1$ multiplexed by the optical multiplexer 37 such that $f_1=f_0+\Delta f$ or $fl_1=f_0-\Delta f$. It is assumed that f is a non-zero value. The optical frequency of the optical carrier wave is denoted by $f_0$.

A value of f is desirably set as f >2B when a band that needs to be secured for data transmission is set to B [Hz]. In addition, f <$f_m$ is desirable in relation to the optical carrier wave the frequency $f_0$, and an optical modulation frequency $f_m$ used for generation of the upper sideband and the lower sideband. When this condition is satisfied, any one of the signal derived from the upper sideband and the signal derived from the lower sideband, emitted as the radio signals, is phase-conjugated again in the course of down conversion inside the photodetector and reconverted into an original modulation signal, thereby making the method of compensating the non-linear effect easy. Although the non-linear compensation is possible even in the case of $\Delta f>f_m$, it is preferable to perform the phase conjugate operation using any one of the upper sideband-derived signal and the lower sideband-derived signal inside the radio receiver.

Figure 8:
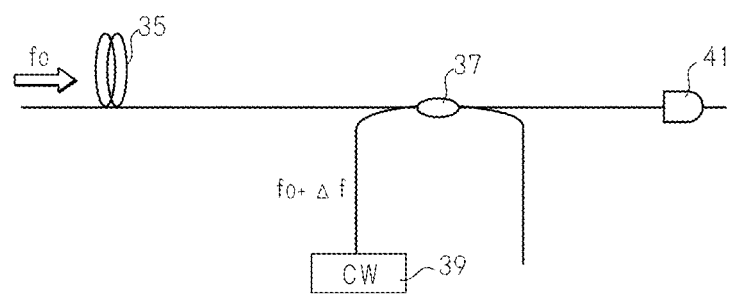
FIG. 8 is a block diagram illustrating a configuration example of the heterodyne C-RoF for generation of the local light using the independent light source.

Even in the case of the heterodyne C-RoF, it is possible to generate the local light using the method of using the independent light source and the method of reusing the optical carrier wave as described above. FIG. 8 is a block diagram illustrating a configuration example of the heterodyne C-RoF for generation of the local light using the independent light source. In a radio using the heterodyne C-RoF, a local light having different frequency from the carrier wave is multiplexed with the phase conjugate signal pair.

In the case of using the independent light source in the heterodyne C-RoF, it is unnecessary to synchronize the optical frequency and the phase to those of the optical carrier wave using the optical phase-locked loop or the like if it is possible to apply the above-described optical frequency difference $\Delta f$ [Hz]. Of course, the optical frequency and the phase may be synchronized with those of the optical carrier wave using the optical phase-locked loop or the like.

Figure 9:
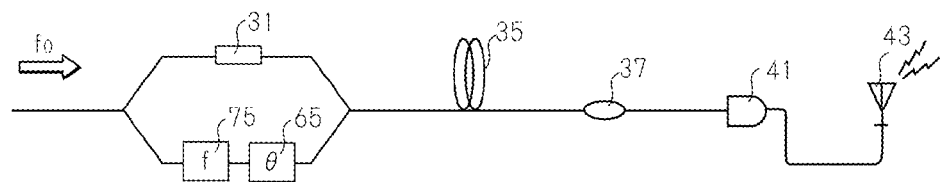
FIG. 9 is a block diagram illustrating a configuration example for generation of the local light by reusing the optical carrier wave.

When the carrier wave is reused in the heterodyne C-RoF, the optical carrier wave on the optical transmitter side is reused as the local light. FIG. 9 is a block diagram illustrating a configuration example for generation of the local light by reusing the optical carrier wave. Further, the component having the frequency corresponding to the optical carrier wave is subjected to the processing of changing a frequency using a frequency adjustment unit 75, such as a frequency shifter, and is further input to the phase adjustment unit 65, such as the phase shifter, and the phase is adjusted such that the above-described situation can be achieved in the multiplexing unit. That is, in this example, the optical carrier wave branched from the continuous light before being subject to the optical modulation is separated. Alternatively, the optical carrier wave is separated from modulation light after being subjected to the optical modulation for generation of the upper sideband and the lower sideband using the optical filter or the like. The optical frequency difference $\Delta f$ [Hz] is applied to this separated optical carrier wave using the optical frequency shifter. Further, the phase of the local light is adjusted such that the above-described situation can be achieved suitably using the phase shifter or the like.

Figure 10:
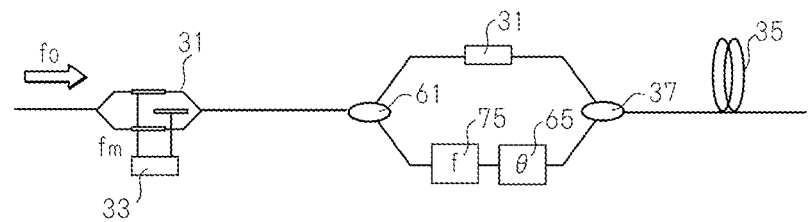
FIG. 10 is a block diagram illustrating a configuration example for generation of the local light by reusing the optical carrier wave.

FIG. 10 is a block diagram illustrating a configuration example for generation of the local light by reusing the optical carrier wave. In this example, a wavelength is separated by a wavelength separation device 61 after obtaining the phase conjugate signal pair using the optical modulator. Further, the component having the frequency corresponding to the optical carrier wave is subjected to the processing of changing a frequency using a frequency adjustment unit 75, such as a frequency shifter, and the phase is adjusted such that the above-described situation can be achieved in the multiplexing unit using the phase adjustment unit 55 such as the phase shifter.

The local light obtained using this method is multiplexed using the multiplexer 17. A multiplexing location may be the optical transmitter side, the receiver side, or an arbitrary location in the middle of the optical fiber transmission path. It is possible to apply an acoustic-optic effect modulator, the optical SSB modulator, and the like as the optical frequency shifter.

Figure 11:
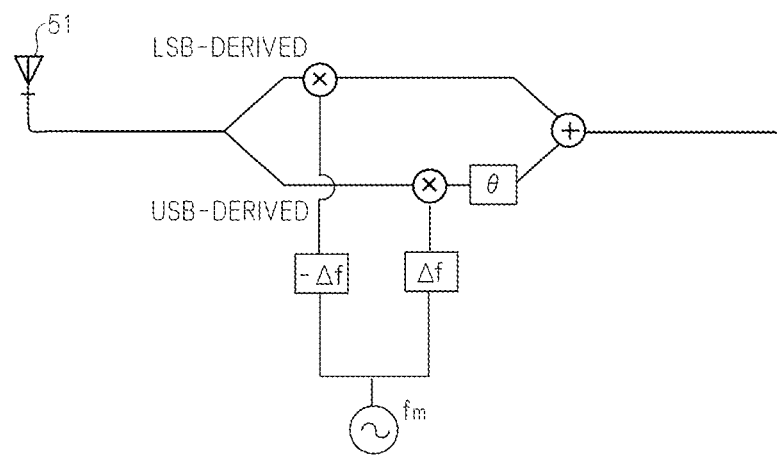
FIG. 11 illustrates a configuration example of a radio receiver using the heterodyne C-RoF.

FIG. 11 illustrates a configuration example of a radio receiver using the heterodyne C-RoF. FIG. 11 is given particularly to describe radio signal processing. Herein, when $\Delta f < f_m$, the upper sideband-derived and lower sideband-derived components are separated from each other and detected, and the detected components are added with the optimal phase angle $\theta_{opt}$. The information on the optimal phase angle $\theta_{opt}$ is obtained, and an operation of adding a phase angle part relating to the optimal phase angle $\theta_{opt}$ to one of the separated upper sideband-derived and lower sideband-derived components (or an operation of causing one component to have the optimal phase angle $\theta_{opt}$) is performed, and then, an operation of adding the upper sideband-derived and lower sideband-derived components may be performed. To be more specific, the adding is performed such that $\theta_{opt} = (\theta_Y + \theta_A)/2$ is kept in the phase angles of the upper sideband-derived and lower sideband-derived components, by using the electrical phase locked loop and the existing electric signal. When $\theta_{opt} = (\theta_v + \theta_A)/2$ is applied with respect to the phase angle $\theta_Y$ of the upper sideband-derived signal and the phase angle $\theta_A$ of the lower sideband-derived signal, the non-linear effect is compensated. Incidentally, for example, the LSB-derived component (or the USB-derived component) may be in the state of being phase-conjugated by the photodetector and returning to the original signal.

Figure 12:
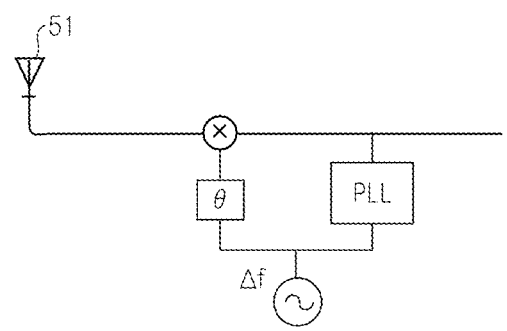
FIG. 12 is a diagram illustrating a configuration example of the radio receiver when $\Delta f > f_m$.

FIG. 12 illustrates a configuration example of the radio receiver when $\Delta f > f_m$. In this case, it is preferable to perform a phase conjugate operation to any one of the upper sideband-derived and lower sideband-derived components prior to the adding. This phase conjugate operation is obtained by multiplying a local sine wave having a frequency $f_m$ using a mixer. The frequency $f_m$ may be obtained by performing the optical frequency and phase control using the electrical phase locked loop or the like so as to keep the relationship of $\theta_{opt} = (\theta_v + \theta_A)/2$. To be more specific, the adding is performed such that $\theta_{opt} = (\theta_Y + \theta_A)/2$ is kept in the phase angles of the upper sideband-derived and lower sideband-derived components, by using the electrical phase locked loop and the existing electric signal. When $\theta_{opt} = (\theta_v + \theta_A)/2$ is applied with respect to the phase angle $\theta_Y$ of the upper sideband-derived signal and the phase angle $\theta_A$ of the lower sideband-derived signal, the non-linear effect is compensated.

In both cases of the homodyne C-RoF and the heterodyne C-RoF, there is no influence of a fading effect according to wavelength dispersion in the optical fiber when the above-described optimal phase angle $\theta_{opt} = (\theta_v + \theta_A)/2$ is kept in both the cases.

The fading effect in which a radio signal to be obtained is changed depending on an optical fiber length when components of double sideband are propagated through an optical fiber together with an optical carrier wave is known in the case of the conventional RoF system. In order to prevent this, two components of the optical carrier wave and the component of one sideband are introduced into the optical fiber in the conventional RoF system.

Basic Configuration of C-RoF

Figure 13:
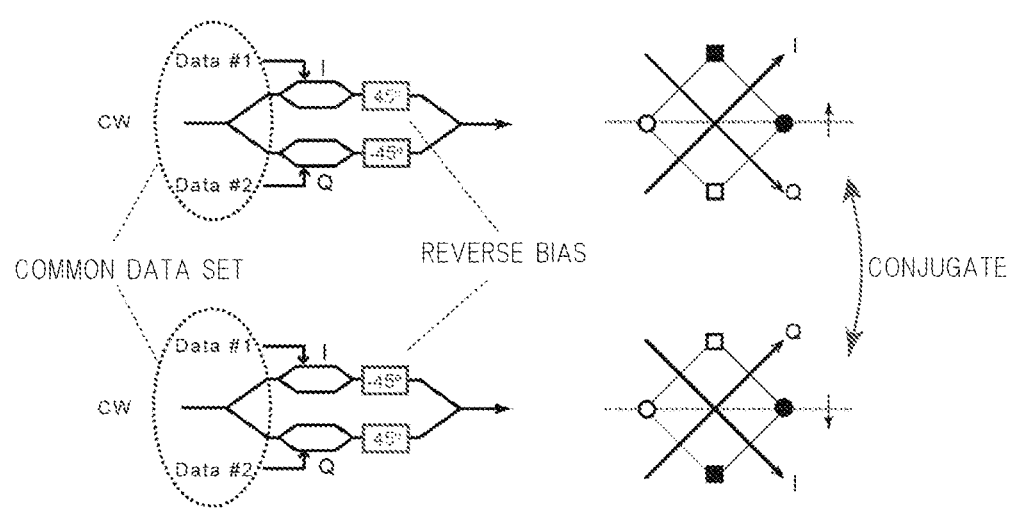
FIG. 13 is a diagram illustrating a principle of an optical phase conjugated-paired radio-on-fiber (C-RoF) system.

FIG. 13 is a diagram illustrating a principle of an optical phase conjugated-paired radio-on-fiber (C-RoF) system. This system uses double sideband (DSB) modulation light in order to cause light serving as a radio (RF) signal to be propagated on an optical fiber link. The double sideband modulation light can be easily generated by applying modulation to continuous (CW) light.

Intensity modulation using a Mach-Zehnder modulator (MZM) to perform push-pull drive with a frequency corresponding to a subcarrier wave of the radio signal is a typical method of obtaining such double sideband the modulation light. The generated upper sideband and lower sideband are simultaneously propagated through the optical fiber and are detected by a high-speed PD (photodetector). A radio-on-fiber (RoF) signal is down-converted through this optical detection to have the frequency of the radio signal, and the original radio wavelength signal is retrieved.

At a glance, this system for obtaining the double sideband modulation is also regarded as one that was typical as an RoF system in the early stage. At the time, a system of a single sideband and a carrier wave (SSB-C) was employed to construct the RoF system since the SSB-C system hardly deteriorated, while a system of the double sidebands and the carrier wave (DSB-C) easily did.

Figure 14:
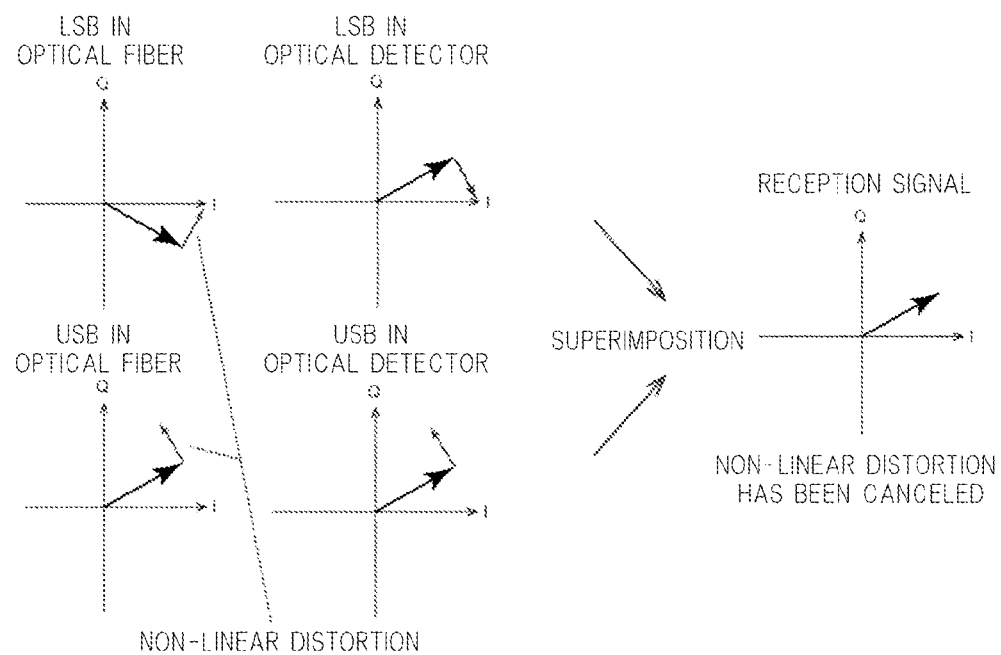
FIG. 14 is a conceptual diagram illustrating a relationship between each component and a non-linear effect such as a non-linear distortion.

In this embodiment, the double sideband and the carrier wave (DSB-C), a system which has not been used in the RoF systems before, are used. In this embodiment, a focus has been particularly placed on an optical phase conjugate relationship between an upper sideband (USB) component and a lower side side band (LSB) component included in the DSB. FIG. 14 is a conceptual diagram illustrating a relationship between each component and a non-linear effect such as a non-linear distortion. In the C-RoF system, the USB and the LSB receive the same amount of influence of the non-linear distortion and the wavelength dispersion from the optical fiber. In particular, when the C-RoF system is driven with high output, self-phase modulation (SPM) and external phase modulation (XPM) are the greatest non-linear effects in the optical fiber. The USB component and the LSB component are subjected to a phase shift caused by the SPM and the XPM as illustrated in FIG. 14. This phase shift is expressed as a vector in FIG. 14. The USB and the LSB receive the same amount of the phase shift in the same direction. The C-RoF system according to this embodiment is configured to offset this non-linear distortion, that is, the influence of the non-linear effect without additionally preparing a dispersion compensator or a non-linear compensator.

Cancellation of Non-Linear Distortion Caused by Optical Fiber

Next, a description will be given how the non-linear distortion caused by the optical fiber is canceled. Basically, one of the double sideband components is phase-conjugated so as to be superimposed on the other component in this embodiment. AS illustrated in FIG. 14, one of a phase conjugate pair component is affected by the non-linear distortion in the opposite direction to that of the other phase conjugate pair component. The influence of the non-linear distortion is canceled by causing these two components to be superimposed on each other. The C-RoF system can achieve the above-described processing only by adding a simple process to photomixing or adding a simple process to demodulation of the radio signal. In the following description, the LSB is set as the component that is subjected to the phase conjugation, and the local continuous light having a signal with a frequency (that is, a wavelength) between the USB and the LSB is applied for simplification.

The embodiment of the present invention can roughly be divided into two aspects. One is an aspect that is named the homodyne C-RoF. In this aspect, the local continuous light has the same frequency as the carrier wave of the C-RoF.

Another one is an aspect that is named the heterodyne C-RoF. This aspect uses the local continuous light having a frequency different from that of the carrier wave of the C-RoF.

Homodyne C-RoF

Figure 15:
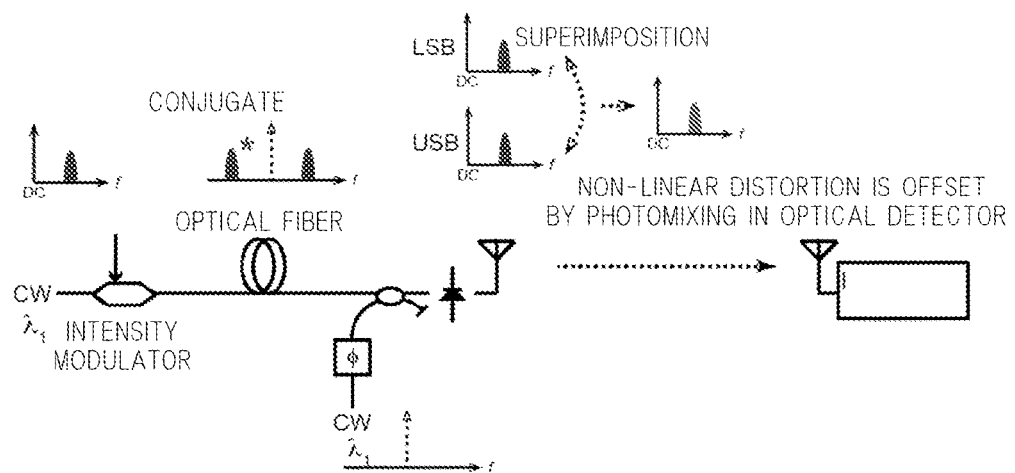
FIG. 15 is a conceptual diagram illustrating the homodyne C-RoF system.

FIG. 15 is a conceptual diagram illustrating the homodyne C-RoF system. In the homodyne C-RoF system, the USB and the LSB are simultaneously down-converted to the same radio frequency region. At this time, the LSB component is the component having a lower frequency than the local light, and thus, the LSB component is subjected to the phase conjugation again to restore the original signal thereof. The USB and the LSB in a phase conjugate state are superimposed on each other according to a light mixing process (photomixing) performed to obtain a radio signal frequency in the photodetector. At this time, what is important is that the USB component and the LSB component in the phase conjugate state are superimposed on each other in the state of being controlled. That is, a phase of the local continuous light is locked to a phase of the carrier wave of the C-RoF, thereby adjusting the optimal situation. The locking of the phase of the local continuous light to the phase of the carrier wave of the C-RoF means that the local continuous light is multiplexed with the optical signal including the carrier wave of the C-RoF in a state where the phase of the local continuous light is the same phase as the phase of the carrier wave of the C-RoF.

For example, this can be achieved by measuring the phase of the carrier wave of the C-RoF and controlling a timing to multiplex the local light, and also by calculating a timing at which the carrier wave of the C-RoF is output and time taking until the carrier wave reaches the multiplexing unit, and then, adjusting time taking until the local light reaches the multiplexing unit.

For this reason, DSB (DSB-C) modulation including a carrier wave is preferably employed in a certain embodiment. In another aspect, an optical phase lock loop, that is, two optical phase lock loops are used. In these aspects, it is possible to cancel the non-linear distortion as described above.

Heterodyne C-RoF

Figure 16:
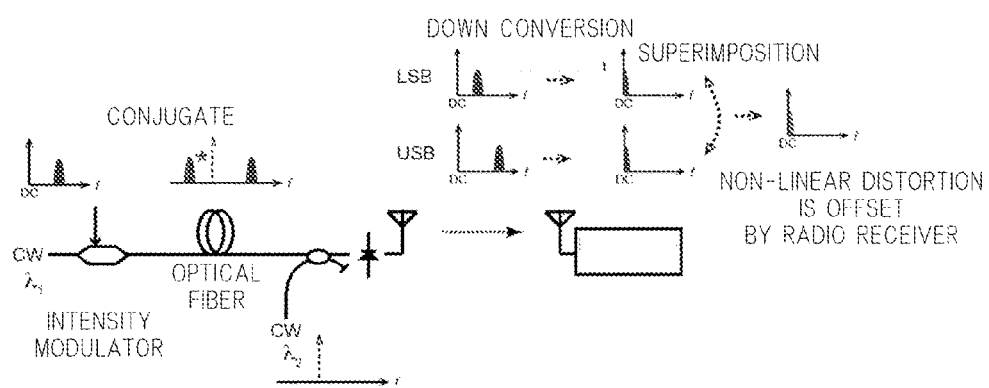
FIG. 16 is a conceptual diagram illustrating the heterodyne C-RoF system.

FIG. 16 is a conceptual diagram illustrating the heterodyne C-RoF system. In the heterodyne C-RoF system illustrated in this example, both the USB component and the LSB component are down-converted to have different frequency components. One sideband (here, LSB) component is turned into a conjugate state even in this heterodyne C-RoF system, which is similar to the homodyne C-RoF system. However, the double sidebands are not superimposed on each other in the output of the photodetector, which is different from the homodyne C-RoF system. In the heterodyne C-RoF, the down-converted double components are emitted as radio signals, respectively, and detected together by a detector of a radio signal receiver. This receiver is configured in such a manner that the LSB-derived component that has been phase-conjugated is superimposed on the USB-derived component. This processing can be easily implemented a digital processor (operating device) and a data restoration function (data recovery unit) in the receiver, and as a result, the non-linear effect can be easily canceled. In the heterodyne C-RoF, it is unnecessary to lock the local continuous light to the carrier wave of the C-RoF signal since the phase lock loop (PLL) inside the receiver can trace a phase drift of the local continuous light. This system can generate not only the local continuous light in a local place separated from the central station but also the optical signal serving as the local continuous light in the central station.

As described above, there are two main aspects of the C-RoF system. These are the homodyne C-RoF system and the heterodyne C-RoF system. These systems require the local continuous light, but can directly use each configuration of a C-RoF transmission system using the typical DSB-C and a C-RoF transmission system using the DSB-SC. Although the heterodyne C-RoF system requires to occupy a doubled band, but it is unnecessary to lock the phase of the local continuous light to the phase of the carrier wave of the RoF.

FIG. 13 is a conceptual diagram illustrating a bias shift-type electro-optical effect phase conjugate signal pair generator. This phase conjugate signal pair generator includes two quadrature modulators. Both the quadrature modulators are driven by the same inphase (I) signal and quadrature (Q) signal. However, biases are set such that a main bias of one quadrature modulator (a bias of a main Mach-Zehnder modulator) becomes $\pi/2$, and a main bias of the other quadrature modulator becomes $-\pi/2$.

In FIG. 13, the biases on the I and Q components sides are described, respectively, as $[\pi/4, \pi/4]$ in the upper quadrature modulator, and are described, respectively, as $[+\pi/4, \pi/4]$ in the lower quadrature modulator, for convenience of the description. Arrangement of symbols of modulation signals output from the respective modulators is illustrated on the right of FIG. 13. In this example, the symbol arrangement in the case of the QPSK modulation is illustrated. Different signs in the drawing means different symbols, and it is understood that the symbol arrangement of output signals of the respective quadrature modulators is symmetric with respect to the dotted line in the drawing. That is, it is understood that the modulation light output from this pair of quadrature modulators have a relationship of being phase-conjugated to each other.

According to this technique, the phase conjugate signal pair can be generated without performing signal processing in an electric stage, by using the same I and Q signal sources as drive signals. This electro-optical effect phase conjugate signal pair generator can be also applied to a wavelength multiplexing system, a polarization multiplexing system, and any phase conjugate pair transmission. In the case of the wavelength multiplexing system, beams of light input to the respective quadrature modulators are set to have different wavelengths, and the optical signal pair is transmitted using different wavelengths. On the other hand, the optical signal pair is transmitted as polarization components orthogonal to each other in the case of the polarization multiplexing. In this case, beams of light having the same wavelength are input to the respective quadrature modulator, and the outputs thereof may be subjected to polarization synthesis.

EXAMPLE 1

Figure 17:
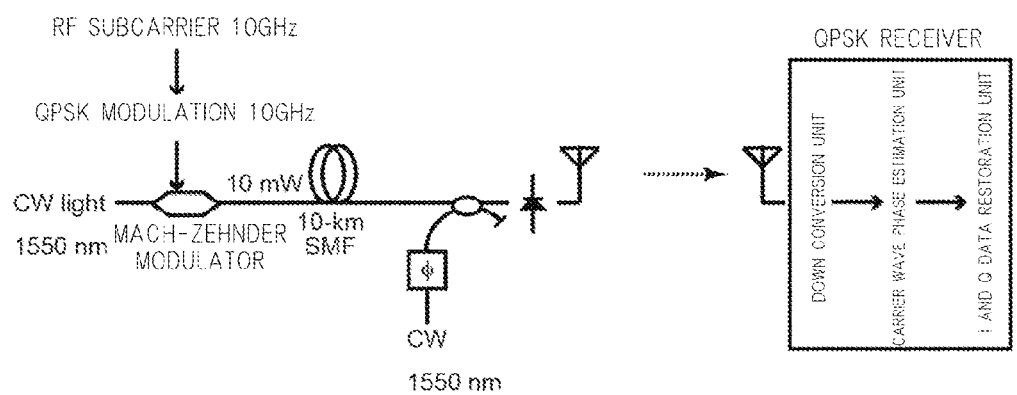
FIG. 17 is a schematic view of a system in numerical analysis of Example.

Hereinafter, the above-described system will be numerically analyzed. In the following numerical analysis, the analysis is performed using the homodyne C-RoF system. It is assumed that a multilevel signal, such as QPSK and QAM, including a subcarrier of a radio signal is transmitted to a remote location via a standard single-mode fiber. FIG. 17 is a schematic view of the system in the numerical analysis of Example.

Continuous light is subjected to intensity modulation in a push-pull Mach-Zehnder modulator (MZM), set to a null bias, on a transmitter side, that is, a central station side in the C-RoF system. The MZM performs modulation as follows using an RF signal. A RF sub-carrier signal having a frequency of 10 GHz is subjected to data modulation by an IQ modulation unit, thereby generating a QPSK signal. A symbol rate of this data is 5 GBaud. It is possible to generate a DSB-SC signal, that is, a C-RoF signal using this device. The generated RoF signal has OSNR (in 0.1 nm) of 27 dB.

The RoF signal is propagated through the standard single-mode fiber having the following parameter characteristics. A fiber length (L)=10 km, a propagation loss ($\alpha$) =0.2 Db/km, and a non-linearity coefficient ($\gamma$)=2.6 $W^{-1}km^{-1}$. A group-velocity dispersion ($\beta 2$=−16 $ps^2$/km, and an input intensity (launched power) to an optical fiber of 10 mW.

The received RoF signal and local continuous light (local light) are combined on a receiver side, that is, in a remote station of the C-RoF system, and are introduced into a photodetector. A wavelength of the local light is set to have the same frequency as that of a carrier wave of the RoF signal. The photodetector is assumed to operate at sufficiently high speed in response to a radio frequency region of 10 GHz. The RF signal output from the photodetector is subjected to down conversion by an RF down converter, a transport delivery restoration process, and a phase lock process, whereby the I component and the Q component are restored. In general, a radio frequency component from the photodetector is emitted from an antenna as a radio signal.

Figure 18:
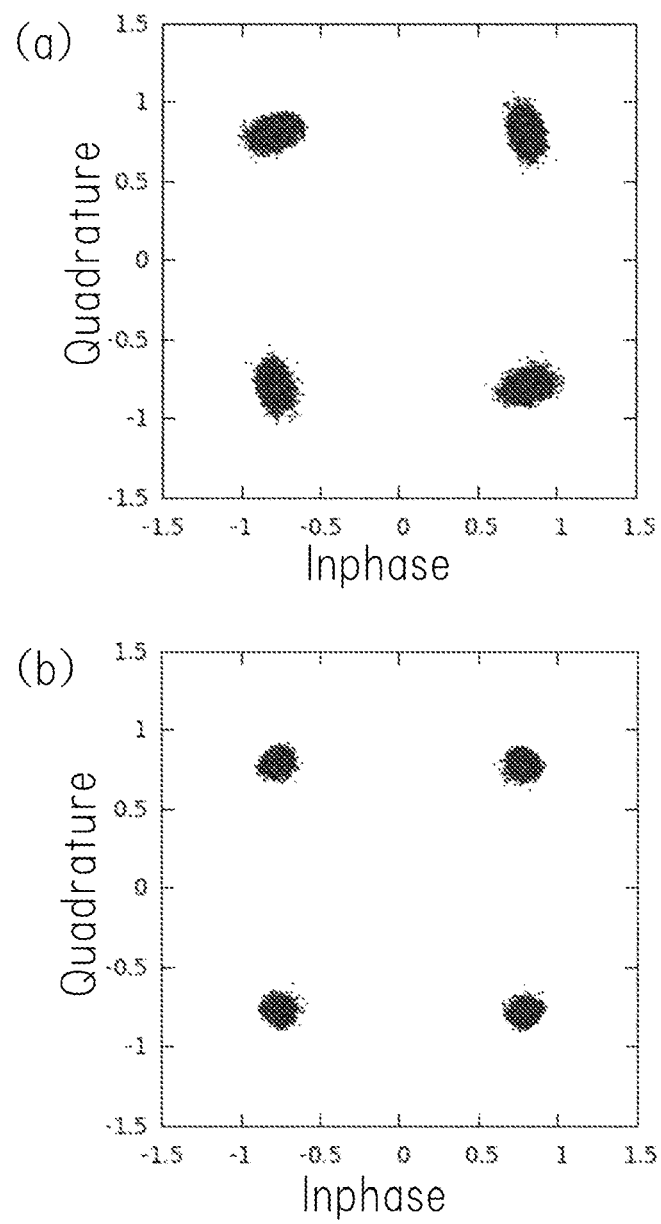
FIGS. 18(*a*) and 18(*b*) are constellation maps of a reception signal.

FIGS. 18($a$) and 18($b$) are constellation maps of a reception signal. FIG. 18($a$) is the constellation map of the QPSK signal that is obtained by the RoF system based on the conventional SSB-C technique. As illustrated in FIG. 18($a$), it is understood that the symbol has been distorted. In this case, this distortion is caused by a non-linear distortion generated by the SPM. FIG. 18($b$) is the constellation map of the QPSK signal that is obtained by the C-RoF system. From FIG. 18($b$), it is understood that the obtained constellation map is not affected by the non-linear distortion. That is, it is illustrated that the influence of the non-linear effect caused by the optical fiber has been canceled by the C-RoF system.

EXAMPLE 2

Figure 19:
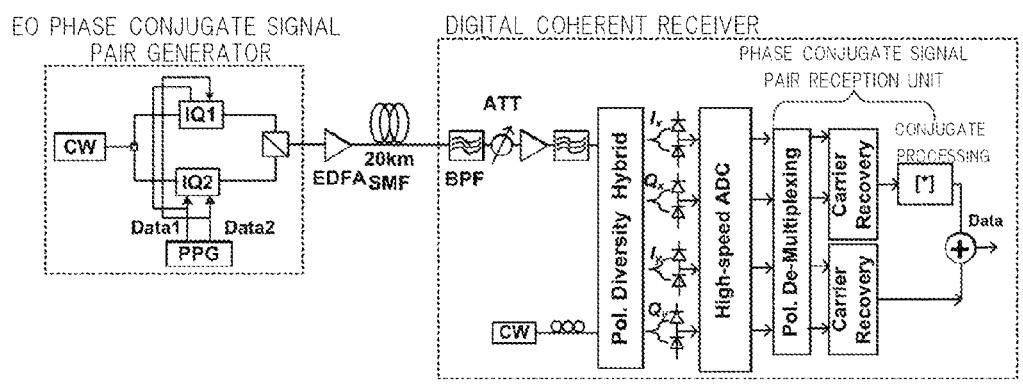
FIG. 19 is an experimental configuration diagram for validation of a principle of a bias shift-type electro-optical effect phase conjugate signal pair generator.

FIG. 19 is an experimental configuration diagram for validation of a principle of a bias shift-type electro-optical effect phase conjugate signal pair generator. Herein, a compensation effect of a self-phase modulation effect is illustrated based on SMF transmission of 20-Gb/s QPSK. The transmission of the phase conjugate signal pair is performed using the configuration of polarization multiplexing. Continuous light having a wavelength of 1552 nm, output from a fiber laser with a line width of 10 kHz, is branched by the optical coupler on the transmitter side, and the branched beams of light are input to the two independent quadrature modulators, respectively. The quadrature modulators are driven at the same timing using the same I and Q data. A drive signal is an NRZ signal generated by a pulse pattern generator and has a pattern length form of 215-1PRBS. Both secondary Mach-Zehnder modulators of the respective quadrature modulators are set to a null-point bias. The main biases thereof are $\pi/2$ and $-\pi/2$, respectively. According to this configuration a 20-Gb/s QPSK signal and a phase conjugate signal thereof are obtained from the respective quadrature modulators. The obtained phase conjugate signal pair is subjected to polarization multiplexing such that there is no delay between double signals by a polarization beam splitter. The phase conjugate signal pair after being subjected to the polarization multiplexing is amplified by an optical fiber amplifier to be 17.6 dBm, and then, input to a single-mode fiber (SMF) having the total length of 20 km. On the other hand, the received phase conjugate signal pair is received on the receiver side through a polarization diversity-type digital coherent detector. First, homodyne mixing with the local light is performed using a 90-degree hybrid coupler, which includes a balanced detector at an output port thereof, and an inphase quadrature component and a phase component of each polarization component (with respect to the local light) are detected. These detection signals are subjected to high speed digitization at a sampling rate of 50 GSa/s, and then, are subjected to digital signal processing which has polarization separation and carrier phase estimation functions. One signal (phase-conjugated signal) between the phase-retrieved QPSK signal pair is subjected to phase conjugation again, and then, is added with the other signal. These types of the digital signal processing are performed as offline processing.

Figure 20:
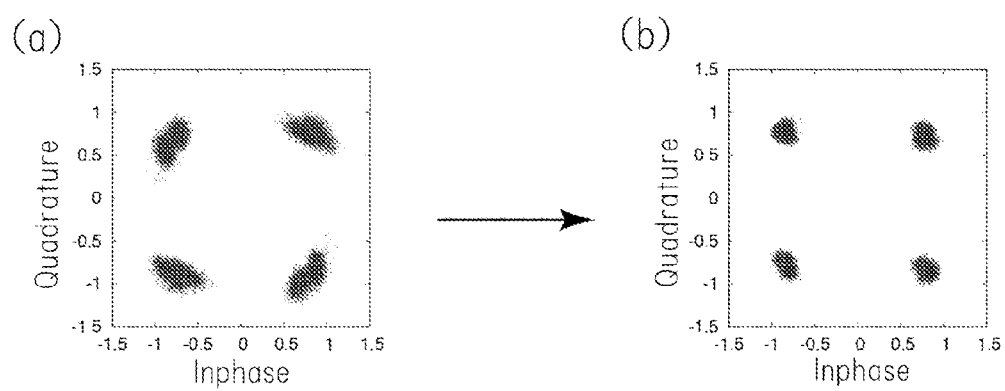
FIGS. 20(*a*) and 20(*b*) are diagrams illustrating experimental results of Example 2.

FIGS. 20($a$) and 20($b$) are diagrams illustrating experimental results of Example 2. FIGS. 20($a$) and 20($b$) are received constellations, and correspond, respectively, to a case where the non-linear effect in the optical fiber is not compensated (using the technique of the phase conjugate signal pair) and a case where the non-linear effect is compensated. As illustrated in FIG. 20($a$), a non-linear phase shift is found in the case of non-compensation. It is considered that this is caused by the self-phase modulation effect and a cross-phase modulation effect due to orthogonally polarized component. On the other hand, it is understood that these non-linear effects are offset and the clear constellation is obtained by performing the non-linear compensation using the phase conjugate signal pair on the receiver side as illustrated in FIG. 20($b$). According to the experimental results, it has been confirmed that the phase conjugate signal pair is surely generated by the proposed electro-optical effect phase conjugate signal pair generator.

INDUSTRIAL APPLICABILITY

The present invention may be used in the industry of information communication using light.

REFERENCE SIGNS LIST 11 optical modulator
13 signal source
15 optical fiber
17 multiplexing unit
19 multiplexing local signal source
21 photodetector
23 transmitting antenna
25 emission device
31 optical modulator
33 signal source
35 optical fiber
37 multiplexing unit
39 multiplexing local signal source
41 photodetector
43 transmitting antenna
45 emission device
51 receiving antenna
53 signal processing device
55 reception device

The invention claimed is:

1. A method of compensating a non-linear optical effect that is caused when an optical signal is propagated through an optical fiber, the method comprising:

obtaining a phase conjugate signal pair which comprises an upper sideband and a lower sideband;

simultaneously inputting the upper sideband and the lower sideband to the optical fiber;

multiplexing the optical signal having a same frequency as the optical carrier wave with the upper sideband and the lower sideband in a state where there is no phase difference among the optical signal, the upper sideband, and the lower sideband;

causing a photodetector to detect the multiplexed optical signal;

transmitting an electric signal based on the optical signal detected by the photodetector to a transmitting antenna; and causing the transmitting antenna to emit a radio signal based on the electric signal.

2. An emission device (25) of a radio signal obtained by compensating a non-linear optical effect that is caused when an optical signal is propagated through an optical fiber, the device comprising:

an optical modulator (11) to which a carrier wave is input;

a signal source (13) which outputs a modulation signal and a bias signal that are applied to the optical modulator (11);

the optical fiber (15) to which a phase conjugate signal pair which comprises an upper sideband and a lower sideband, as an optical signal output from the optical modulator (11), is simultaneously input;

a multiplexing unit (17) which is connected to the optical fiber (15);

a multiplexing local signal source (19) which is configured to multiplex the optical signal having a same frequency as the optical carrier wave with the upper sideband and the lower sideband using the multiplexing unit (17) in a state where there is no phase difference among the optical signal, the upper sideband, and the lower sideband;

a photodetector (21) which detects the multiplexed optical signal; and a transmitting antenna (23) which receives an electric signal based on the optical signal detected by the photodetector.

3. A method of compensating a non-linear optical effect that is caused when an optical signal is propagated through an optical fiber, the method comprising:

obtaining a phase conjugate signal pair which comprises an upper sideband and a lower sideband;

simultaneously inputting the upper sideband and the lower sideband to the optical fiber;

multiplexing the optical signal with the upper sideband and the lower sideband;

causing a photodetector to detect the multiplexed optical signal;

transmitting an electric signal based on the optical signal detected by the photodetector to a transmitting antenna;

causing the transmitting antenna to emit a radio signal based on the electric signal;

causing a receiving antenna to receive the radio signal emitted from the transmitting antenna; and receiving an electric signal based on the radio signal received by the receiving antenna, adjusting a signal derived from the upper sideband and a signal derived from the lower sideband, thus received, to remove a phase difference therebetween, and then, multiplexing the signals.

4. A radio communication system comprising:

an optical modulator (31) to which a carrier wave is input;

a signal source (33) which outputs a modulation signal and a bias signal that are applied to the optical modulator (31);

an optical fiber (35) to which a phase conjugate signal pair including an upper sideband and a lower sideband, as an optical signal output from the optical modulator (31), are simultaneously input;

a multiplexing unit (37) which is connected to the optical fiber (35);

a multiplexing local signal source (39) which is configured to multiplex the optical signal with the upper sideband and the lower sideband using the multiplexing unit (37);

a photodetector (41) which detects the multiplexed optical signal;

a radio signal transmission device (45) which includes a transmitting antenna (43) that receives an electric signal based on the optical signal detected by the photodetector;

a receiving antenna (51) which receives a radio signal emitted from the transmitting antenna (43); and a radio signal reception device (55) which includes a signal processing device (53) configured to receive an electric signal based on the radio signal received by the receiving antenna, to adjust a signal derived from the upper sideband and a signal derived from the lower sideband, thus received, to remove a phase difference therebetween, and then, to multiplex the signals.

* * * * *